(12) United States Patent
Florez

(10) Patent No.: US 11,639,612 B1
(45) Date of Patent: May 2, 2023

(54) VEHICLE RACK

(71) Applicant: Otoniel Florez, Plantation, FL (US)

(72) Inventor: Otoniel Florez, Plantation, FL (US)

( * ) Notice: Subject to any disclaimer, the term of this patent is extended or adjusted under 35 U.S.C. 154(b) by 185 days.

(21) Appl. No.: 17/166,747

(22) Filed: Feb. 3, 2021

(51) Int. Cl.
*B60R 9/045* (2006.01)
*E04H 15/06* (2006.01)
*E04H 15/48* (2006.01)
*E04H 15/38* (2006.01)

(52) U.S. Cl.
CPC ............. *E04H 15/06* (2013.01); *B60R 9/045* (2013.01); *E04H 15/38* (2013.01); *E04H 15/48* (2013.01)

(58) Field of Classification Search
CPC . B60R 9/045; B60R 9/048; B60R 2011/0056; B60R 2011/0084
See application file for complete search history.

(56) References Cited

U.S. PATENT DOCUMENTS

| 3,431,922 | A | * | 3/1969 | Kilbride | E04H 15/06 |
| | | | | | 135/904 |
| 3,845,775 | A | * | 11/1974 | Norris | E04H 15/06 |
| | | | | | D21/834 |
| 4,294,486 | A | * | 10/1981 | Espejo | E04H 15/32 |
| | | | | | 135/88.15 |
| 5,280,801 | A | * | 1/1994 | Brosman | B60P 3/34 |
| | | | | | 135/141 |
| 8,944,486 | B2 | * | 2/2015 | Donohoe | B60J 11/04 |
| | | | | | 296/136.03 |
| 10,406,987 | B1 | * | 9/2019 | Lester | B60R 9/042 |
| 10,543,771 | B2 | | 1/2020 | Sautter | |
| 2011/0101056 | A1 | * | 5/2011 | Barkey | B60R 9/058 |
| | | | | | 224/325 |
| 2013/0001267 | A1 | * | 1/2013 | Infantino | B60R 9/045 |
| | | | | | 224/539 |
| 2015/0123422 | A1 | * | 5/2015 | Bennett | B60R 9/04 |
| | | | | | 296/136.1 |
| 2016/0031354 | A1 | * | 2/2016 | Miles | A47B 51/00 |
| | | | | | 211/1.51 |
| 2016/0159290 | A1 | * | 6/2016 | Tamaddon-Dallal | |
| | | | | | B60R 9/045 |
| | | | | | 224/402 |
| 2017/0144609 | A1 | * | 5/2017 | Poudrier | B60R 9/045 |
| 2018/0112432 | A1 | | 4/2018 | Xu | |
| 2019/0009729 | A1 | * | 1/2019 | Mercurio | B60R 9/042 |
| 2020/0062188 | A1 | * | 2/2020 | Boyle | B60R 9/045 |
| 2020/0070731 | A1 | * | 3/2020 | Schafer, Jr. | B60R 7/04 |
| 2020/0384837 | A1 | * | 12/2020 | Singer | B60R 9/058 |
| 2021/0155165 | A1 | * | 5/2021 | Larsson | B60R 9/058 |
| 2021/0370751 | A1 | * | 12/2021 | Schafer, Jr. | B60R 9/058 |
| 2021/0380042 | A1 | * | 12/2021 | Jonsson | B60R 9/045 |
| 2022/0017018 | A1 | * | 1/2022 | Perkins | E04H 15/06 |
| 2022/0162879 | A1 | * | 5/2022 | Davis | E04H 15/48 |
| 2022/0234509 | A1 | * | 7/2022 | Wright | B60R 9/06 |

* cited by examiner

*Primary Examiner* — Brian D Nash
(74) *Attorney, Agent, or Firm* — Sanchelima & Associates, P.A.; Christian Sanchelima; Jesus Sanchelima

(57) ABSTRACT

A rack system including a rail assembly, a leg assembly and a vehicle assembly is disclosed. The rail assembly includes load support rails secured to a roof of a vehicle. The load support rails receive legs therein. The legs extend towards a ground surface. The legs include a telescopic portion which extends until the vehicle roof is elevated off of the vehicle. The legs are defined by a top leg portion and a bottom leg portion that are interconnected with a hinge. Once the legs are extended enough to elevate the roof from the vehicle, the vehicle can be operated while the rack system is left self-standing and self-supported.

19 Claims, 9 Drawing Sheets

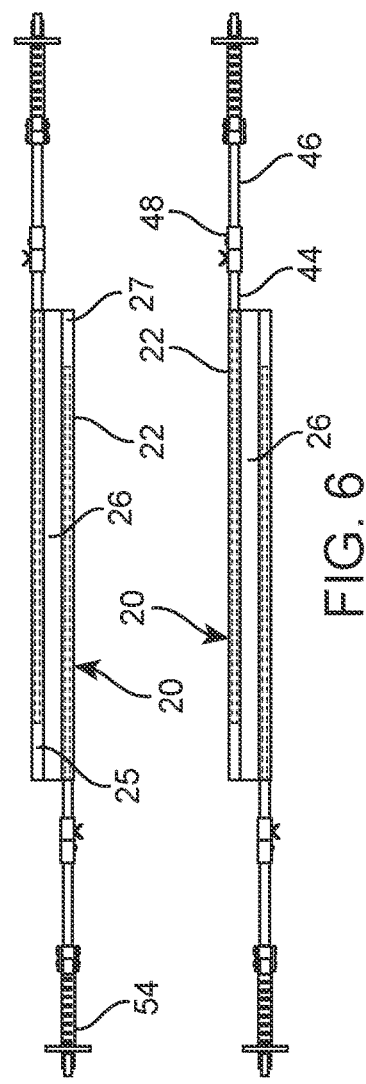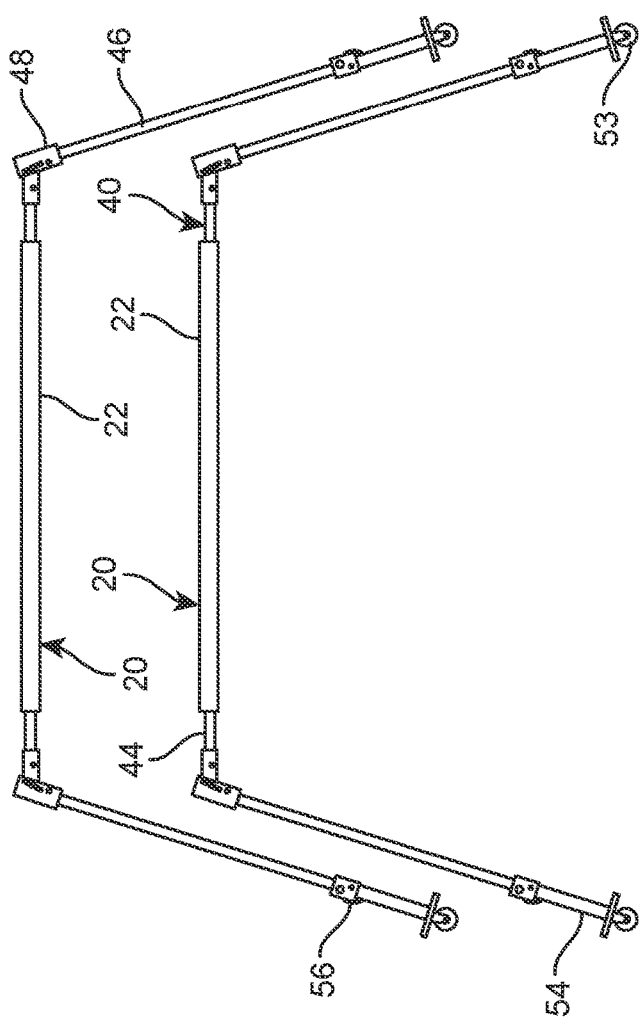
FIG. 6
FIG. 7

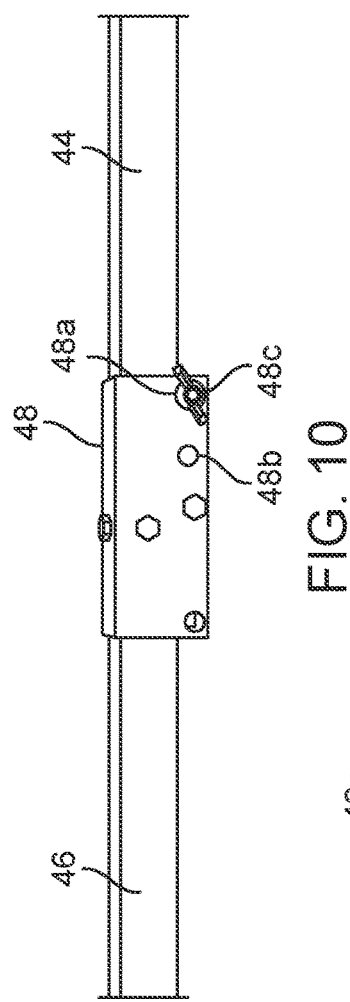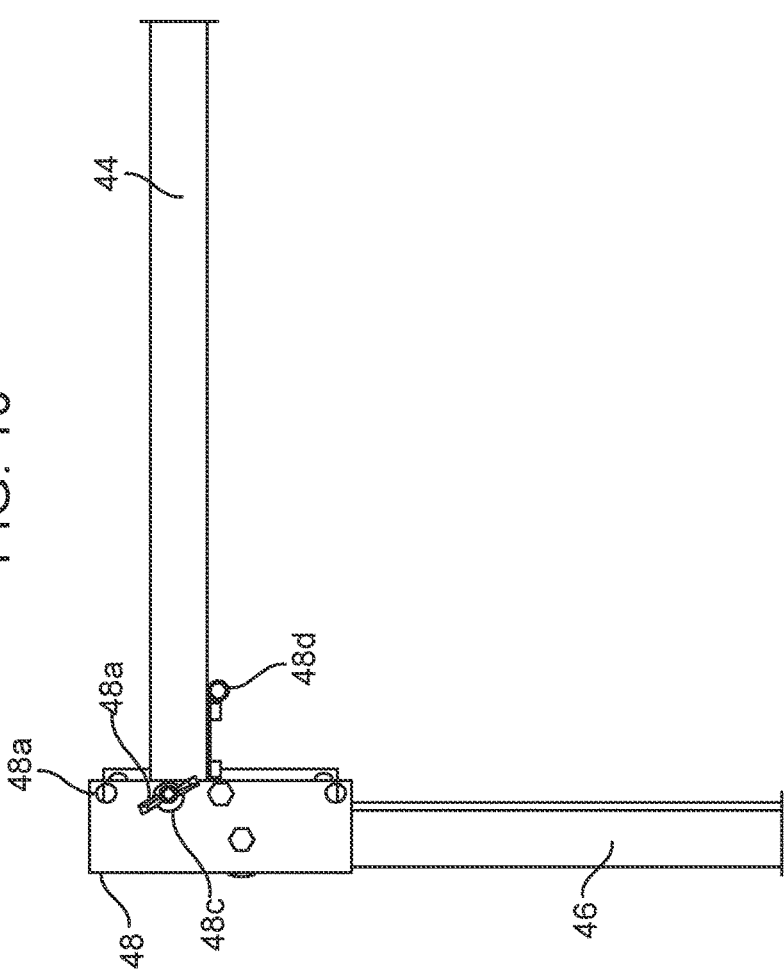

VEHICLE RACK

BACKGROUND OF THE INVENTION

1. Field of the Invention

The present invention relates to a vehicle rack, more particularly, to a vehicle rack that can be detached and erected on a ground surface when separated from the vehicles, thereby allowing for the vehicle to remain operatable.

2. Description of the Related Art

Several designs for vehicle racks have been designed in the past. None of them, however, include a roof rack for vehicles that can be detached from the vehicles and remain expanded and supported on a ground surface. Thereby allowing for the vehicles to remain operable without the need to dissemble the roof rack as the vehicles can be driven away and the roof rack remains assembled and standing.

Applicant believes that a related reference corresponds to U.S. patent application publication No. 2018/0112432 for a folding vehicle roof top tent under manual and electric control. Applicant believes that another related reference refers to U.S. Pat. No. 10,543,771 for a vehicle rooftop rack assembly. None of these references, however, teach of a vehicle rack that can be detached from a vehicle and remains supported on a ground surface with telescopic legs.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a vehicle rack that can be removably secured to a vehicle.

It is another object of this invention to provide a vehicle rack that permits the vehicle to remain entirely operable when secured or removed therefrom.

It is still another object of the present invention to provide a vehicle rack that is self-standing and self-supported when detached from a vehicle.

It is also another object of the present invention to provide a vehicle rack that facilities the transportation of objects on a bed or roof of a vehicle.

It is additionally an object of the present invention to provide a vehicle rack increases the carrying capacity of a vehicle.

It is further an object of the present invention to provide a vehicle rack that is adjustable.

It is still another object of the present invention to provide a vehicle rack that is collapsible and portable.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 6 represents a top view of rack system 10 in a collapsed configuration.

FIG. 7 illustrates a front view of rack system 10 in the expanded configuration.

FIG. 10 illustrates hinge 48 when top leg portion and bottom leg portion are aligned together.

FIG. 11 shows hinge 48 when bottom leg portion 46 extends downwardly from top leg portion 44.

DETAILED DESCRIPTION OF THE EMBODIMENTS OF THE INVENTION

Figure 1:
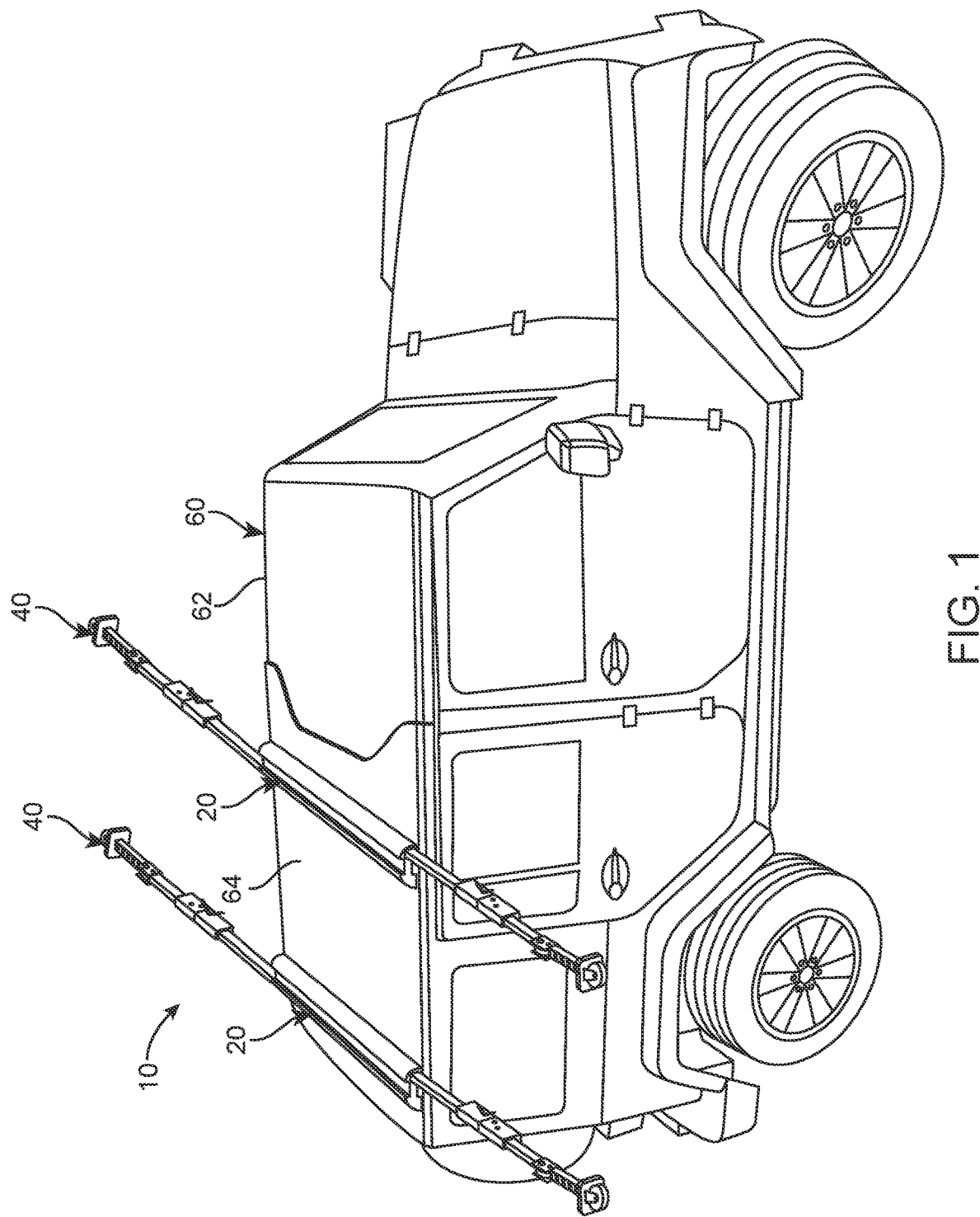
FIG. 1 represents an operational view of rack system 10 secured to a roof 64 of a vehicle 62.

Referring now to the drawings, where the present invention is generally referred to with numeral 10, it can be observed that it basically includes a support rail assembly 20 and a leg assembly 40.

Figure 2:
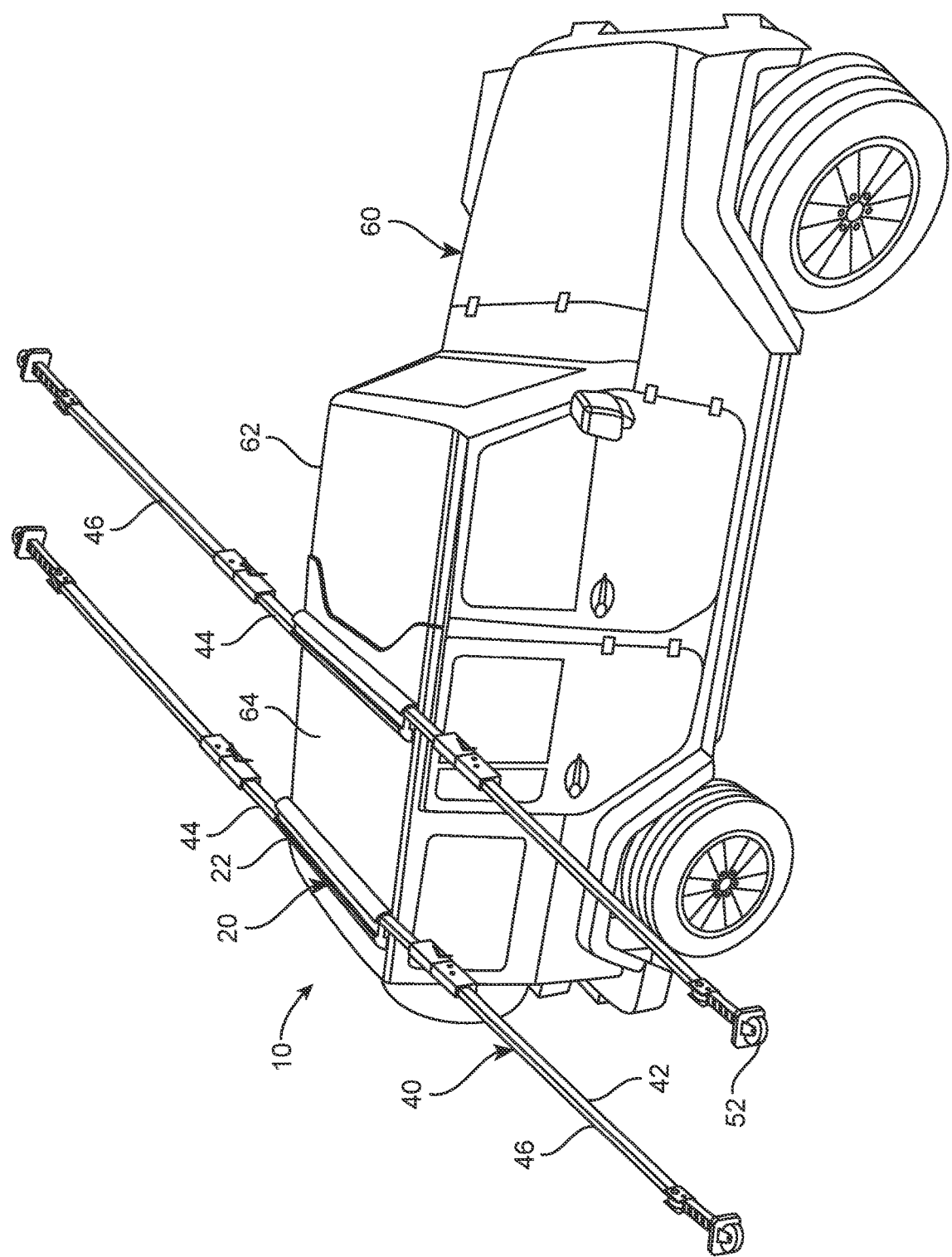
FIG. 2 shows an operational view in which rack system 10 is being expanded while secured to the vehicle 62.

A rack system 10, as best illustrated in FIGS. 1-5, may help to support items on a vehicle 62. More particularly, items on a roof 64 or bed of vehicle 62 such as a roof rack 66 as seen in FIG. 1 or a truck bed. It may be suitable roof 64 itself to be supported by rack system 10, as shown in FIG. 2.

Figure 3:
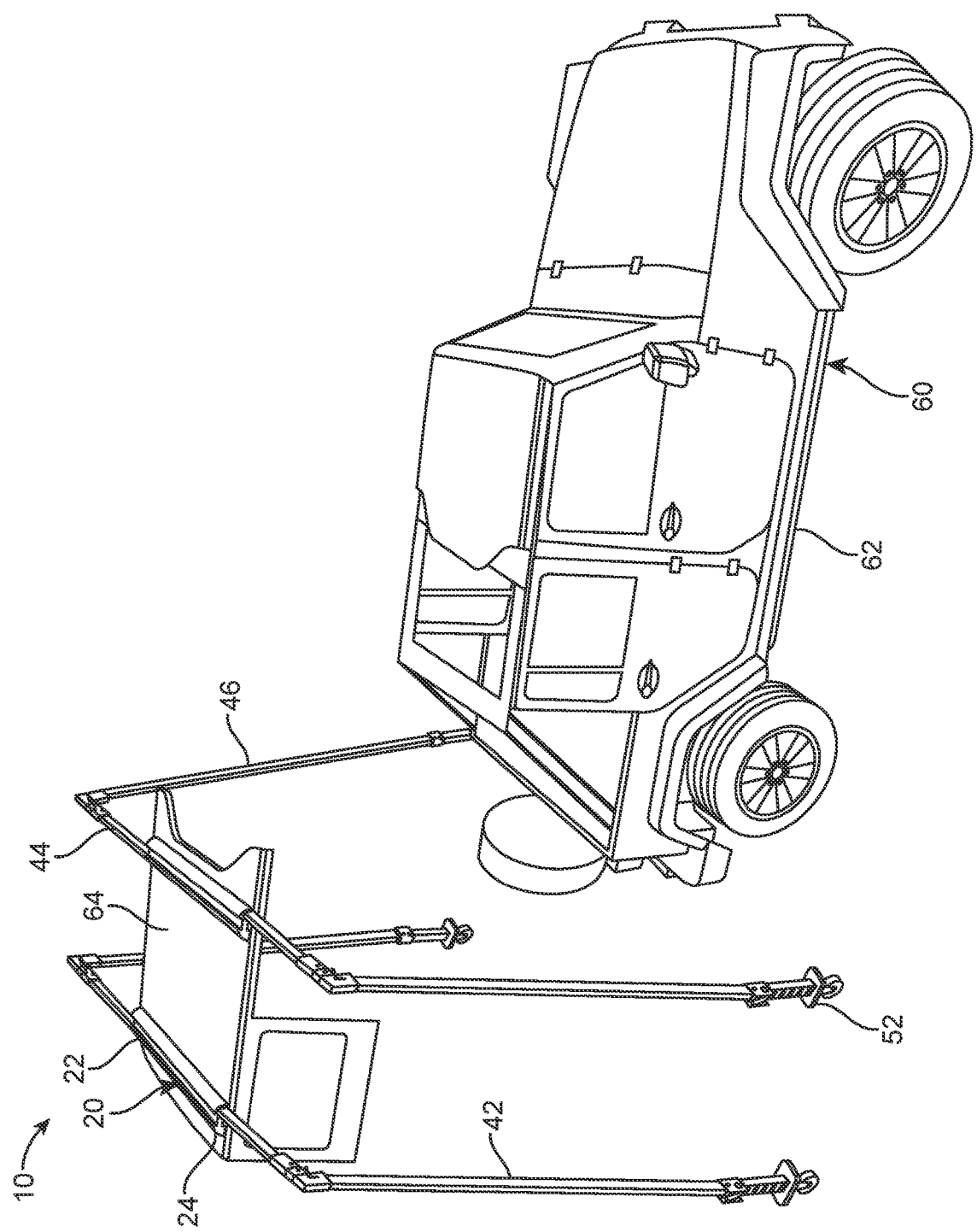
FIG. 3 illustrates an operational view in which rack system 10 is expanded to lift roof 64 from vehicle 62 to allow for vehicle 62 to be driven without collapsing rack system 10.
Figure 4:
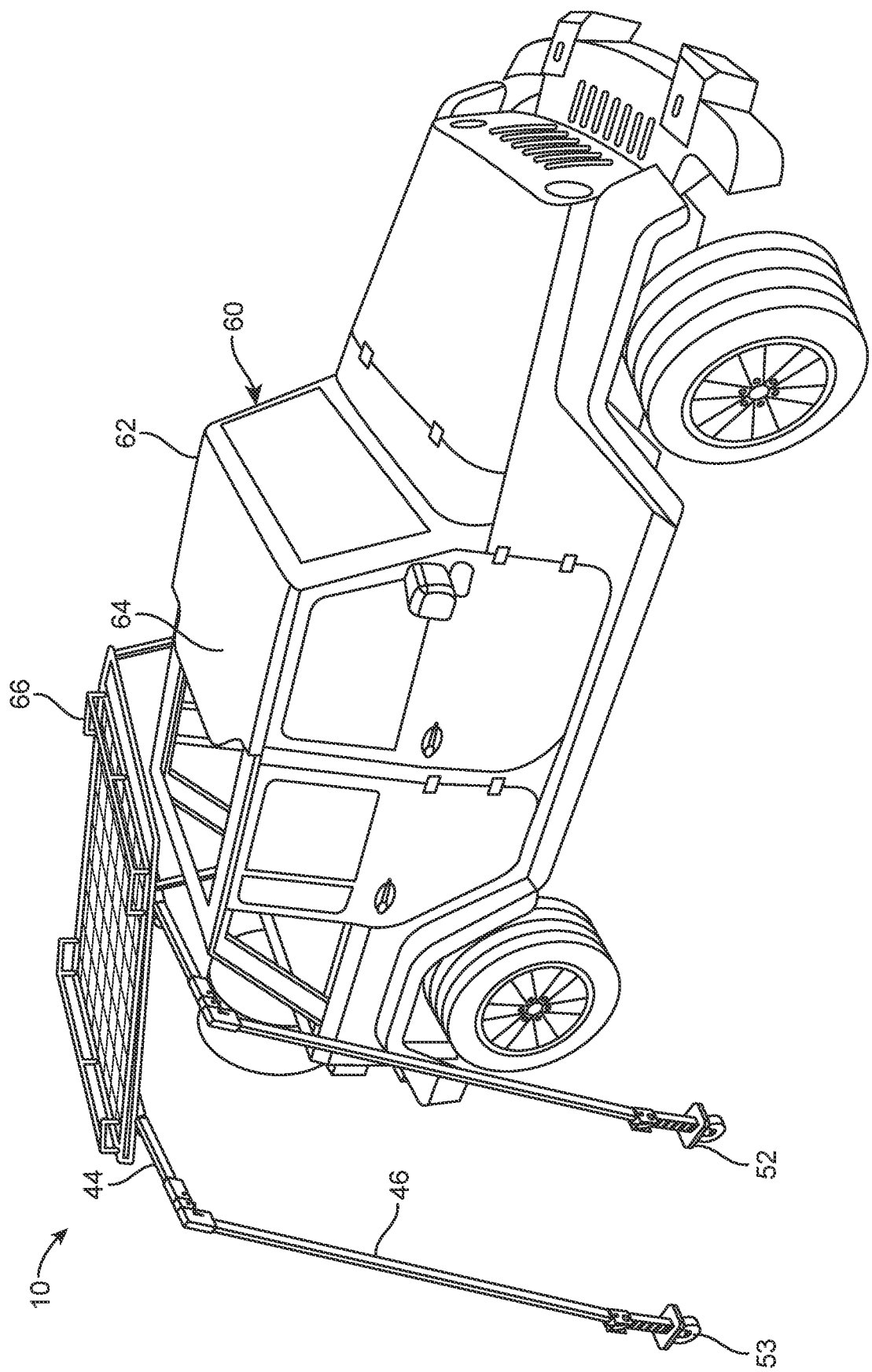
FIG. 4 is a representation of an operational view in which rack system 10 is expanded to lift a roof rack 66 from vehicle 62 to allow for vehicle 62 to be driven without collapsing rack system 10.
Figure 5:
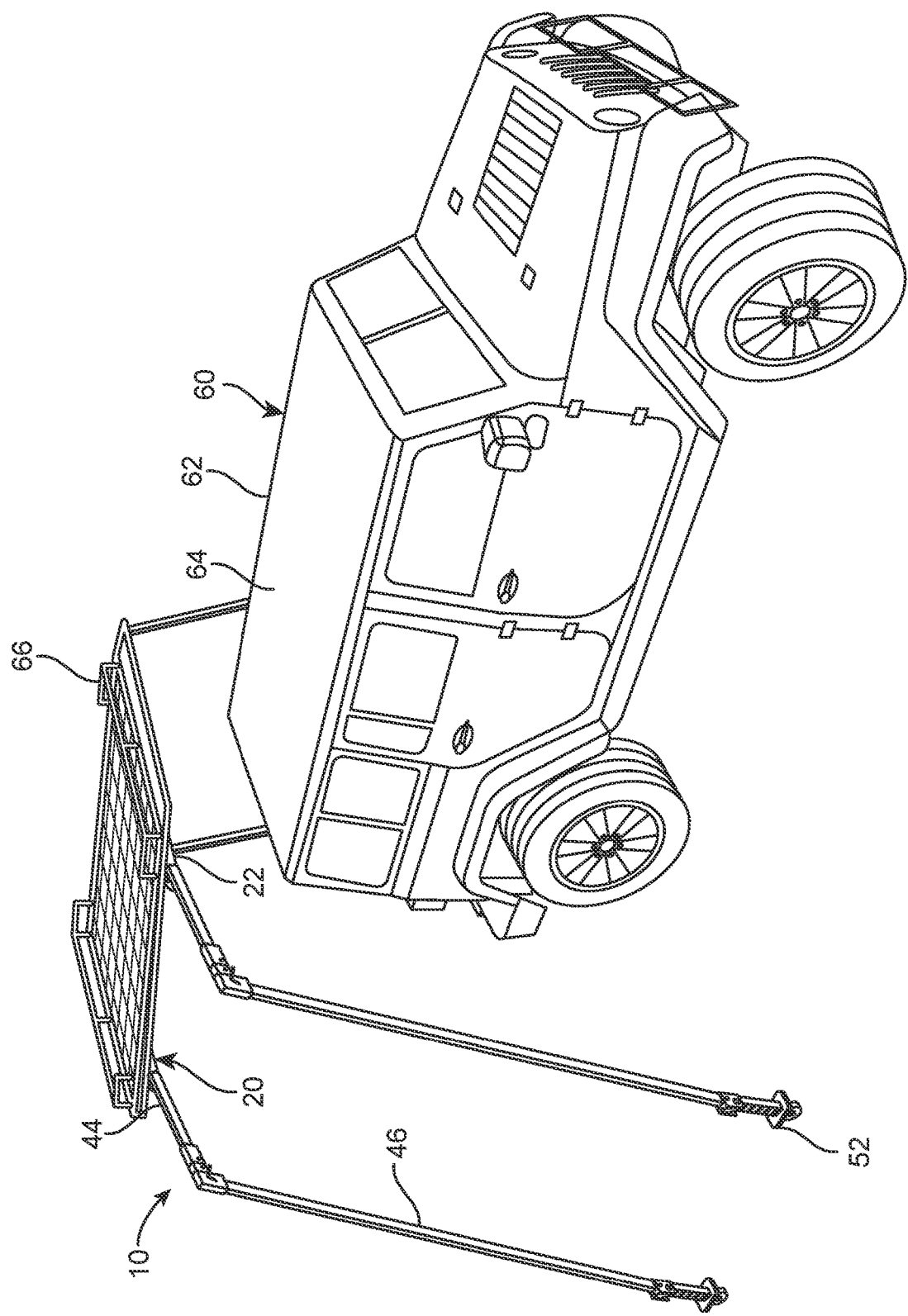
FIG. 5 shows another operational view in which rack system 10 is expanded to lift a roof rack 66 from vehicle 62 to allow for vehicle 62 to be driven without collapsing rack system 10.
Figure 8:
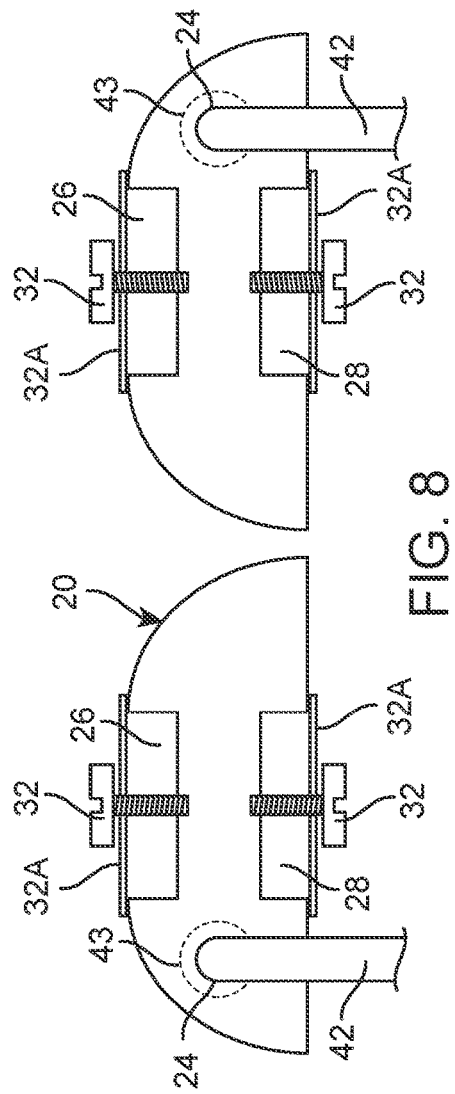
FIG. 8 shows a left and right view of load support rails 22.

Rack system 10 may include support rail assembly 20 as best seen in FIG. 3. Support rail assembly 20 may include load support rails 22. Each of load support rails 22 may have a flat elongated cylindrical configuration, in the preferred embodiment. It may be suitable for load support rails 22 to be made of materials such as plastic, rubber, aluminum, wood, plexiglass, metal or the like. Load support rails 22 may each be hollow to receive and accommodate leg assembly 40 within. It is to be understood that each of load support rails 22 may include an opening 24, on each lateral side of each of load support rails 22, extending entirely therethrough. Each of opening 24 may be diagonal from one another on load support rails 22. Opening 24 may lead to an interior of each of load support rails 22. In one implementation, opening 24 may be circular in shape. Opening 24 may lead to an interior of each of load support rails 22 and be accessed through lateral sides thereof. It is to be understood that leg assembly 40 may be accessed through opening 24 on each of load support rails 22. One of opening 24 may lead to a first inner channel 25. While another of opening 24 may lead to a second inner channel 27. Within each of first inner channel 25 and second inner channel 27 may be received one of legs 42 of leg assembly 40. First inner channel 25 and second inner channel 27 may each extend an entire length of each of load support rails 22. It is to be understood that first inner channel 25 and second inner channel 27 may be parallel to each other.

Each of load support rails 22 may include a top channel 26 and a bottom channel 28 located at a top and bottom, respectively, of load support rails 22. Top channel 26 and bottom channel 28 may be recessed within load support rails 22. Top channel 26 and bottom channel 28 may extend between first inner channel 25 and second inner channel 27. It is to be understood that top channel 26 and bottom channel 28 may be parallel to first inner channel 25 and second inner channel 27. Top channel 26 and bottom channel 28 may each extend an entire length of each of load support rails 22. Top channel 26 and bottom channel 28 may each extend a partial width of each of load support rails 22. Importantly, each of load support rails 22 may be detachably secured to vehicle 62 on roof 64. It may be suitable to removably secure load support rails 22 to vehicle 62 with fasteners 32 such as screws, nails, hook and loop straps, magnets or the like. The present invention may include washers 32a that cooperate with each of fasteners 32. Load support rails 22 may be mounted atop of vehicle 62 such that bottom channel 28 is directly atop of vehicle 62. Fasteners 32 and washers 32a may then extend through vehicle 62 from underneath, preferably through roof 64, and through bottom channel 28 to secure load support rails 22 to vehicle 62. It is to be understood that top channel 26 may be used in a similar manner to secure roof rack 66 to vehicle 62. Roof rack 66 may be mounted onto load support rails 22 supported atop of vehicle 62. Additional fasteners 32 and washers 32a are secured through roof rack 66 and through top channel 26 to secure roof rack 66 to load support rails 22. Load support rails 22 may each extend a width of roof 64, preferably. In the preferred implementation, load support rails 22 may be arranged parallel to each other when secured to vehicle 62 or roof rack 66. It may be suitable for rack system 10 to include at least two of load support rails 22. Additional of load support rails 22 may be used for added stability and support.

It is to be understood that within each of load support rails 22 may be leg assembly 40. Leg assembly 40 may include legs 42. One of legs 42 may be slidably received within first inner channel 25 and second channel 27. Legs 42 may help rack system 10 to be self-supported on a ground surface when there is a need to use vehicle 62, while leaving rack system 10 fully assembled and functional. Legs 42 help to lift rack system 10 and items secured atop off of vehicle 62. Thus, allowing vehicle 62 to remain fully operational at times when rack system 10 is retracted or expanded. Legs 42 may preferably be solid. Legs 42 may include a collapsed and expanded configuration. Legs 42 may extend outwardly and away from lateral sides of each of load support rails 22 through opening 24 when needed. Legs 42 may each have a substantially straight configuration that becomes an L shaped configuration when in use. It may be suitable for legs 42 on each lateral side of load support rails 22 to be integral with one another, in one implementation. Thereby resulting in legs 42 each having a U-shaped configuration, in an alternate embodiment.

Legs 42 may each be defined by a top leg portion 44 and a bottom leg portion 46. Legs 42 may be pulled out of load support rails 22 to achieve the expanded configuration. Each of top leg portion 44 and bottom leg portion 46 may be secured together with a hinge 48 extending therebetween. Hinge 48 facilitates the movement of bottom leg portion 46. Top leg portion 44 may extend horizontally from load support rails 22. Subsequently, bottom leg portion 46 may extend vertically towards the ground surface from top leg portion 44 with the help of hinge 48. Hinge 48 may include a first opening 48a, a second opening 48b, a hinge fastener 48c and a fastener support 48d, as best seen in FIG. 10. First opening 48a and second opening 48b may be adjacent and parallel to each other. It is to be understood that fastener support 48d may be attached to a bottom side of top leg portion 44 adjacent to hinge 48, as best seen in FIG. 11. With legs 42 expanded out of load support rails 22, as best seen in FIGS. 1-2, hinge fastener 48c may extend through hinge 48 and first opening 48a and fastener support 48d. Thereby allowing for top leg portion 44 and bottom leg portion 46 to remain aligned straight as legs 42 expand from load support rails 22. Hinge 48 may facilitate folding and extending bottom leg portion 46 towards the ground surface, as best illustrated in FIG. 11. To extend bottom leg portion 46 towards the ground surface, hinge fastener 48c may be removed from first opening 48a. Thereby allowing for bottom leg portion 46 to fold towards the ground surface. Preferably, top leg portion 44 and bottom leg portion 46 may be perpendicular to each other when bottom leg portion 46 extends towards the ground surface. Hinge fastener 48c may be secured through top leg portion 44 and second opening 48b to ensure top leg portion 44 and bottom leg portion 46 are secured together when bottom leg portion 46 is extended towards the ground surface.

It may be suitable for bottom leg portion 46 to extend diagonally at an obtuse angle with respect to top leg portion 44. With legs 42 in the fully expanded configuration, roof 64 or roof rack 66 may be elevated off of vehicle 62 as best seen in FIGS. 1-2. Subsequently, vehicle 62 may then be operational and be driven without needing to disassemble rack system 10. To prevent each of legs 42 from becoming detached from load support rails 22, each of legs 42 may include a stopper 43 at a rear end within load support rails 22. More specifically, stopper 43 may be secured to a distal end of top leg portion 44 within load support rails 22. It is to be understood that stopper 43 may be a disk in one embodiment. Stopper 43 may have a width greater than each of opening 24 to prevent legs 42 from continuing to expand outwardly from load support rails 22 when stopper 43 is reached. Stopper 43 ensures legs 42 remain secured to load support rails 22 when fully expanded.

At a lower distal end of each of bottom leg portion 46 may be located feet 52. Feet 52 may be square in one embodiment. Feet 52 may help to provide stability to legs 42 when self-supported on the ground surface. Feet 52 may be angled away from each of legs 42. It can be seen that feet 52 may extend outwardly and away from legs 42. Feet 52 may swivel in one embodiment. It may be suitable for feet 52 to be wider than legs 42. In one embodiment, underneath of feet 52 may be grips to prevent rack system 10 from slipping and collapsing when self-standing. It may be suitable for feet 52 to be made of plastic, rubber, plexiglass, wood, aluminum, metal or the like. Optionally, removably secured to the bottom of each of legs 42 may be wheels 53. Wheels 53 may facilitate movement of rack system 10 when detached from vehicle 62.

Figure 9:
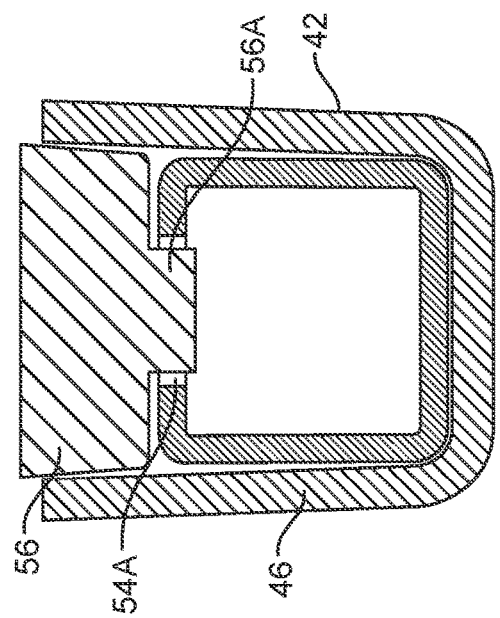
FIG. 9 represents a cross sectional view of telescopic portion 54, more specifically telescopic portion slots 54a being engaged by a tooth 56a of lever 56.
Figure 12:
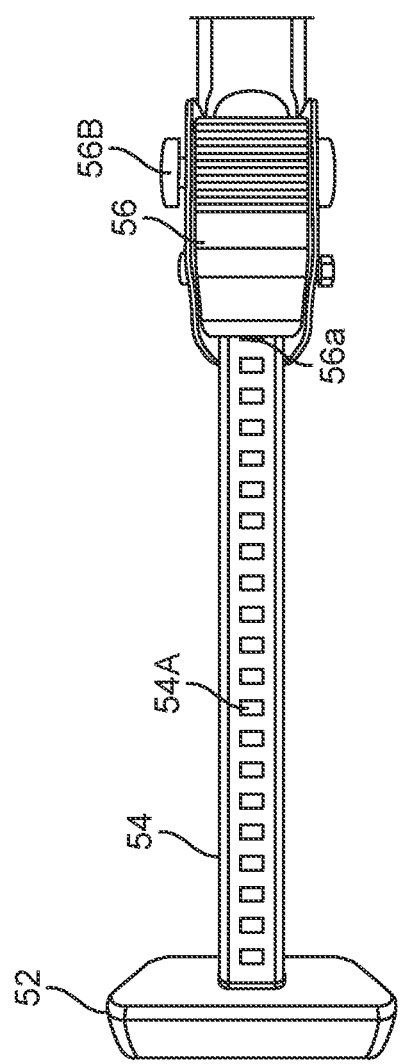
FIG. 12 shows a zoomed in view of telescopic portion 54 and telescopic portion slots 54A.

It can be seen that leg assembly 40 may further include a telescopic portion 54 which may be adjusted in length via a lever 56, as best seen in FIG. 9 and FIG. 12. Telescopic portion 54 may be underneath of each of legs 42 between each of bottom leg portion 46 and feet 52. It is to be understood that telescopic portion 54 may expand and retract when needed. Telescopic portion 54 may help to further increase or decrease the length of legs 42 as needed. It is to be understood that legs 42 end a predetermined distance above of the ground surface. With telescopic portion 54 extending downwardly to make contact with the ground surface. This helps to ensure that legs 42 are in abutting contact with the ground surface for proper support of rack system 10. It may be necessary to adjust legs 42 to different heights to level the present invention. Telescopic portion 54 may be partially exposed when extended. Telescopic portion 54 may include telescopic portion slots 54*a* which extend the entire length of telescopic portion 54. It is to be understood that telescopic portion 54 may be engaged by lever 56. More specifically, one of telescopic portion slots 54*a* may be engaged by a tooth 56*a* of lever 56. One of telescopic portion slots 54*a* may be engaged by tooth 56*a* to prevent telescopic portion 54 from expanding or retracting, as best seen in FIG. 9. Lever 56 may be actuated to lift tooth 56*a* from telescopic portion 54. Lever 56 may be released to engage the selected of telescopic portion slots 54*a*. An opposite distal end of lever 56 may extend outwardly and away from telescopic portion 54. Lever 56 may be actuated by a user at the exposed distal end to release telescopic portion slots 54*a* from lever 56 allowing for telescopic portion 54 to be released and adjusted in length. Subsequently, when the desired length of telescopic portion 54 is achieved, lever 56 may be released to engage one of telescopic portion slots 54*a*. Telescopic portion 54 may help to level legs 42 when the ground surface is uneven. Lever 56 may additionally include a lever lock 56*b* traversing through lever 56. Lever lock 56*b* may be have a locked and unlocked configuration. Lever lock 56*b* may be actuated at lateral sides of lever 56, lever lock 56*b* may be actuated from left to right and vice versa. Lever lock 56*b* may help to provide safety to the users. When lever lock 56*b* is in the locked configuration, lever lock 56*b* prevents lever 56 from being engaged to lift and release tooth 56*a* from telescopic portion slots 54*a*. In one embodiment, lever 56 may include a grip portion to facilitate actuation of lever 56.

Advantageously, rack system 10 may help to facilitate carrying of cargo on vehicle 62. Such that rack system 10 is self-standing and self-sufficient such that rack system 10 may be released from vehicle 62 with cargo still attached thereto. Thereby allowing for vehicle 62 to be operational without the need to disassemble rack system 10.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A rack system, comprising:
   a) a support rail assembly including load support rails, said load support rails are removably secured to a roof of a vehicle, wherein said roof of said vehicle is configured to be removably attached thereon; and
   b) a leg assembly including legs, each of said load support rails receiving at least two of said legs therein, said legs being on opposite sides of said load support rails, said legs being slidable from said load support rails and extending towards a ground surface, wherein each of said legs each include a telescopic portion underneath that is adjustable in length, said telescopic portion extending in and out of each of said legs, said telescopic portion allowing said legs to be adjusted to various heights to level said load support rails when released from said vehicle, when said legs reach said ground surface the legs are capable of being further extended by means of said telescopic portion, thereby a height can be selected.

2. The system of claim 1, wherein said legs are each received within one of said load support rails through openings of said load support rails located at lateral sides thereof.

3. The system of claim 2, wherein said legs are each defined by a top leg portion and a bottom leg portion, said top leg portion including a stopper at a distal end thereof, said stopper having a width greater than each of said openings.

4. The system of claim 3, wherein said top leg portion extends horizontally outwardly and away from each of said load support rails.

5. The system of claim 4, wherein said bottom portion being secured to a distal end of said top leg portion, said bottom leg portion extending vertically towards the ground surface from said top leg portion.

6. The system of claim 3, wherein said top leg portion and bottom leg portion are secured together with a hinge, said hinge including a first opening, a second opening, a hinge fastener, and a fastener support, said fastener support being on an underside of said top leg portion, said top leg portion and said bottom leg portion secured in alignment with one another with said hinge fastener extend through said first opening and said fastener support, said hinge fastener extending through said second opening when said bottom leg portion extends downwardly towards the ground surface.

7. The system of claim 1, wherein one of said openings leading to a first inner channel and one of said legs is received therein, another of said openings leading to a second inner channel and another of said legs is received therein.

8. The system of claim 1, wherein said legs each include feet secured to a distal end thereof, said feet permitting said legs to remain stable on said ground surface.

9. The system of claim 1, wherein said telescopic portion includes telescopic portion slots stacked along a length of said telescopic portion.

10. The system of claim 9, wherein a lever engages one of said telescopic portion slots with a tooth to secure said telescopic portion at a desired length to prevent said telescopic portion from expanding or retracting further.

11. The system of claim 10, wherein said lever is actuated to release said tooth from one of said telescopic portion slots.

12. The system of claim 10, wherein said lever includes a lever lock to secure said tooth into said telescopic portion slots and preventing said lever from being actuated.

13. The system of claim 1, wherein said telescopic portion is selectively exposed.

14. The system of claim 1, wherein said load support rails each include a top channel and a bottom channel, said top channel and said bottom channel extending an entire length of each of said load support rails.

15. The system of claim 14, wherein a roof rack is secured atop of said load support rails, fasteners and washers extending through said roof rack and said top channel of each of said load support rails to secure said roof rack to said load support rails.

16. The system of claim 15, wherein said roof rack is elevated off of said vehicle, said roof rack supported by said load support rails and said legs.

17. The system of claim 15, wherein each of said load support rails are secured atop of said vehicle with additional of said fasteners and washers which extend through said vehicle and said bottom channel from underneath of said vehicle.

18. The system of claim 1, wherein secured underneath of said legs are wheels to facilitate maneuvering of said load support rails.

19. The system of claim 1, wherein said load support rails are secured to said roof of said vehicle, said legs being extended until said roof is detached and suspended above of said vehicle.

\* \* \* \* \*